US005846026A

United States Patent [19]

Gilbert et al.

[11] Patent Number: 5,846,026

[45] Date of Patent: Dec. 8, 1998

[54] METHOD FOR PIPELINE PADDING

[75] Inventors: Jerry F. Gilbert; John Gilbert, both of Southlake; William Neal Brown, Duncanville; Jack Smith, The Colony, all of Tex.

[73] Assignee: Trencor, Inc., Grapevine, Tex.

[21] Appl. No.: 82,441

[22] Filed: May 21, 1998

Related U.S. Application Data

[62] Division of Ser. No. 811,422, Mar. 5, 1997, Pat. No. 5,788,168.

[51] Int. Cl.[6] .................... F16L 1/028; E02F 5/12

[52] U.S. Cl. .................... 405/179; 405/174; 37/142.5

[58] Field of Search .................... 405/179, 174; 37/142.5; 241/101.742, 101.763, 101.77

[56] References Cited

U.S. PATENT DOCUMENTS

| | | | |
|---|---|---|---|
| 3,099,408 | 10/1960 | Williams | 241/187 |
| 3,465,973 | 9/1969 | Williams | 241/86 |
| 3,964,719 | 6/1976 | Hally et al. | 241/101.7 |
| 4,057,917 | 11/1977 | Burrows | 37/195 |
| 4,338,985 | 7/1982 | Smith et al. | 241/101.742 |
| 4,377,365 | 3/1983 | Layh | 414/334 |
| 4,418,872 | 12/1983 | Nelson | 241/187 |
| 4,461,428 | 7/1984 | Williams | 241/34 |
| 4,529,134 | 7/1985 | Williams | 241/30 |
| 4,633,602 | 1/1987 | Layh et al. | 37/195 |
| 4,637,753 | 1/1987 | Swisher | 404/90 |
| 4,640,364 | 2/1987 | Theurer | 171/16 |
| 4,664,791 | 5/1987 | McClain et al. | 209/421 |
| 4,755,001 | 7/1988 | Gilbert | 299/39 |
| 4,767,066 | 8/1988 | Williams | 241/27 |
| 4,812,078 | 3/1989 | Rivard | 405/179 |
| 4,912,862 | 4/1990 | Bishop et al. | 37/14 |
| 4,948,299 | 8/1990 | Cronk et al. | 405/179 |
| 5,026,205 | 6/1991 | Gorski et al. | 404/72 |
| 5,028,170 | 7/1991 | Gorski et al. | 404/72 |
| 5,092,657 | 3/1992 | Bryan | 299/1.1 |
| 5,097,610 | 3/1992 | Bishop | 37/142.5 |
| 5,120,433 | 6/1992 | Osadchuk | 209/235 |
| 5,195,260 | 3/1993 | Osadchuk | 37/142.5 |
| 5,228,220 | 7/1993 | Bryan | 37/364 |
| 5,261,171 | 11/1993 | Bishop | 31/142.5 |
| 5,314,267 | 5/1994 | Osadchuk | 405/184 |
| 5,363,574 | 11/1994 | Osadchuk | 37/142.5 |
| 5,430,962 | 7/1995 | Osadchuk | 37/142.5 |
| 5,465,511 | 11/1995 | Umberson | 37/355 |
| 5,479,726 | 1/1996 | Bishop | 37/142.5 |
| 5,540,003 | 7/1996 | Osadchuk | 37/142.5 |
| 5,694,709 | 12/1997 | Cronk et al. | 37/142.5 |
| 5,741,087 | 4/1998 | Osadchuk | 405/179 |
| 5,788,168 | 8/1998 | Gilbert et al. | 37/142.5 X |

FOREIGN PATENT DOCUMENTS

| | | | |
|---|---|---|---|
| 2158489 | 11/1985 | United Kingdom | 27/142.5 |

*Primary Examiner*—Tamara L. Graysay
*Assistant Examiner*—Jong-Suk Lee
*Attorney, Agent, or Firm*—Locke Purnell Rain Harrell

[57] ABSTRACT

A method for pipeline padding for reducing the size of spoil disposed in a pile utilizes a vehicle having first and second sides adapted for movement on the surface of the spoil pile. The vehicle includes first and second surface engaging devices disposed on each side of the vehicle. The spoil is crushed using a crushing assembly connected to the vehicle for movement with the vehicle. Spoil is transferred using a transferring assembly connected to the vehicle for movement with the vehicle for transferring spoil from the pile to the crushing assembly. Disposed between the vehicle sides, adjacent the transferring assembly and connected to the vehicle for movement with the vehicle is a control structure for controlling passage of spoil from the spoil pile forward of the surface engaging devices to a position under the surface engaging devices.

8 Claims, 3 Drawing Sheets

METHOD FOR PIPELINE PADDING

RELATED APPLICATION

This application is a division of U.S. application Ser. No. 08/811,422, filed Mar. 5, 1997, entitled "Self-Loading Mobile Crusher System, and now U.S. Pat. No. 5,788,168.

TECHNICAL FIELD OF THE INVENTION

The present invention relates to an apparatus for padding pipe, and more particularly to a self-loading mobile crusher system for reducing the size of debris.

BACKGROUND OF THE INVENTION

In the process of laying pipe, an excavation is made utilizing, for example, a backhoe, trenching machine, or the like. Excavated rocks and soil, which is commonly referred to as "spoil", is piled to one side of the excavation. After the pipe is laid in the excavation, the excavation is usually filled in with the spoil. However, it is important that large rocks in the spoil do not come into contact with the pipe, which may damage the pipe and cause unnecessary corrosion of the pipe. For this reason, it is common to fill the trench around the portion of the excavation surrounding the pipe with fine material which has been separated from the spoil. This process is known as padding, and has been a time consuming and expensive stage of laying an underground pipeline.

Previously developed systems have utilized mechanisms such as, for example, screens for separating fine material out of the spoil and transporting the separated fine material into an excavation. Such systems are not efficient, and result in the need to dispose of rock which is separated from the fine material.

A need has thus arisen for a system for reducing the size of debris typically found in a spoil pile for padding pipe.

SUMMARY OF THE INVENTION

In accordance with the present invention, a self-loading mobile crusher system for reducing the size of debris disposed in a pile is provided. The system includes a vehicle having first and second sides adapted for movement on the surface of the debris pile. The vehicle includes first and second surface engaging devices disposed on each side of the vehicle. A debris crushing assembly is connected to the vehicle for movement with the vehicle. A debris transferring assembly is connected to the vehicle for movement with the vehicle for transferring debris from the pile to the crushing assembly. Disposed between the vehicle sides, adjacent the transferring assembly and connected to the vehicle for movement with the vehicle is a control structure for controlling passage of debris from the debris pile forward of the surface engaging devices to a position under the surface engaging devices.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which.

DESCRIPTION OF THE PREFERRED EMBODIMENTS

Figure 1:
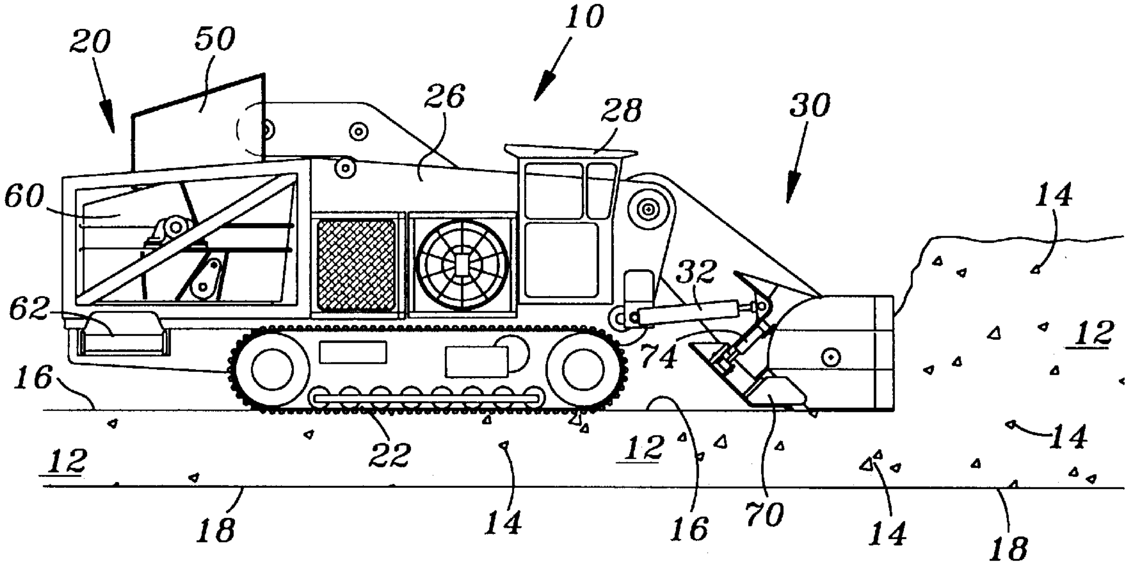
FIG. 1 is a side elevational view of the present self-loading mobile crusher system shown on the surface of a spoil pile.

Referring simultaneously to FIGS. 1–5, wherein like numerals are utilized for like and corresponding components, the present self-loading mobile crusher system is illustrated, and is generally identified by the numeral 10. System 10 is utilized for reducing the size of debris disposed in a pile such as, for example, a spoil pile created as a result of excavation. FIG. 1 illustrates a spoil pile 12 including rocks 14. System 10 is adapted to be positioned on a surface 16 of spoil pile 12. Surface 16 is above a ground surface 18 underlying spoil pile 12. As used herein, "spoil" or "debris" shall include, for example, rocks and soil excavated from a trench, construction material resulting from demolition of a building, such as, brick, cement, wood, and wallboard, or vegetation, such as, for example, downed trees and tree limbs.

As will subsequently be described, an important aspect of the present invention is to create a level surface 16 for system 10 as system 10 moves over surface 16 of spoil pile 12.

System 10 includes a self-propelled tracked vehicle, generally identified by the numeral 20. Tracked vehicle 20 includes a pair of endless track elements 22 and 24 mounted on the right and left sides of tracked vehicle 20, respectively. Track elements 22 and 24 are provided with drive sprockets which are driven by a chain from a hydraulic motor output (not shown). Tracked vehicle 20 includes a mainframe 26 and a cab 28.

Mounted to tracked vehicle 20 for movement with tracked vehicle 20 is a debris loading assembly, generally identified by the numeral 30. Loading assembly 30 is pivotally mounted to mainframe 26 utilizing a pair of hydraulic cylinders 32. Loading assembly 30 includes a pair of auger assemblies 36 and 38 for collecting and directing spoil to a spoil transfer assembly, generally identified by the numeral 40. Spoil transfer assembly 40 includes a conveyor 42 having first and second ends **42*a* and 42*b*, and a conveyor 44 having ends 44*a* and 44*b*. Conveyor 42 is mounted on loading assembly 30 and receives spoil from spoil pile 12 at end 42*a* which is located between auger assemblies 36 and 38. Conveyor 42 transports spoil from end 42*a* to end 42*b* disposed adjacent to mainframe 26. Conveyor 44 is mounted to mainframe 26, and receives spoil at end 44*a* from conveyor end 42*b*. Spoil is then transported to end 44*b* of conveyor 44 to be deposited into a hopper 50 disposed on mainframe 26. Conveyors 42 and 44 include a plurality of spaced elements 52 for contacting and moving spoil from loading assembly 30 to hopper 50**.

Hopper 50 delivers spoil to a crushing assembly 60 mounted to mainframe 26. Crushing assembly 60 may comprise, for example, a hammer mill having traveling breaker plates which is described in U.S. Pat. No. 3,099,408, which description and drawings are incorporated herein by reference. Crushing assembly 60 functions to reduce spoil pile 12 and rocks 14 to a fine material to be returned to the area surrounding a pipe in an excavated trench. The crushed material is returned to the excavation via a conveyor 62 connected to mainframe 26. Conveyor 62 may deposit crushed material onto ground surface 18 to a location out of the forward path of vehicle 20 or into an excavated trench for pipeline padding purposes.

Figure 5:
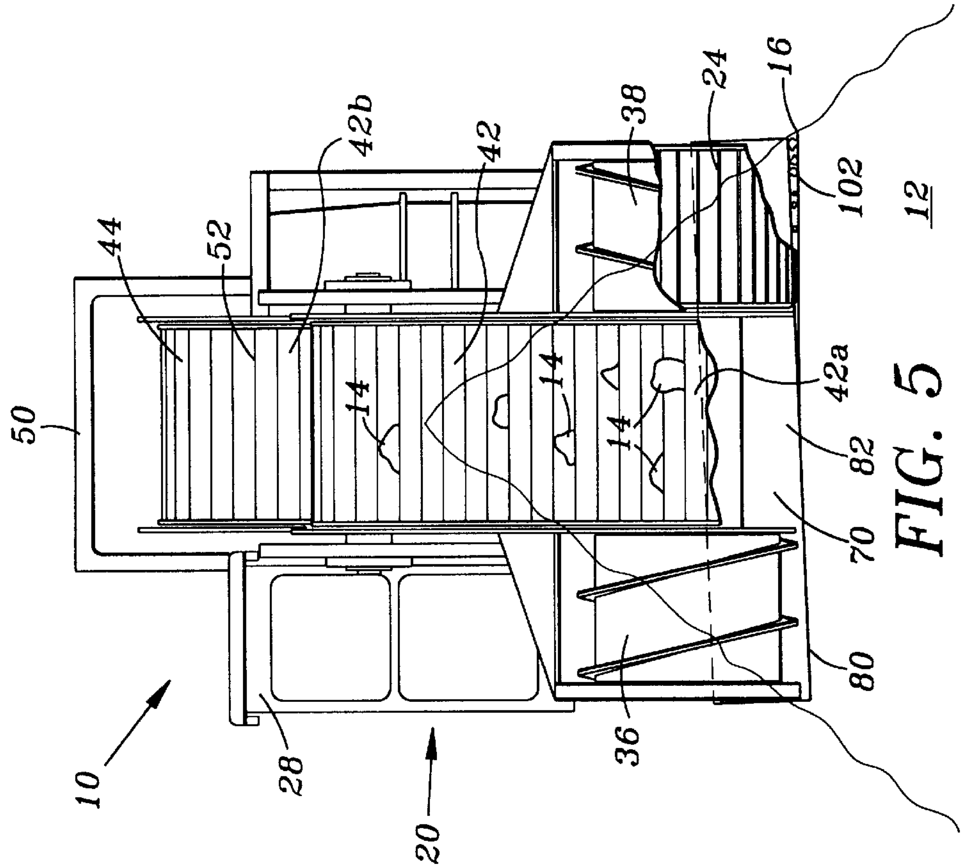
FIG. 5 is a front elevational view of the present self-loading mobile crusher system illustrating the mold board in a second position.
Figure 4:
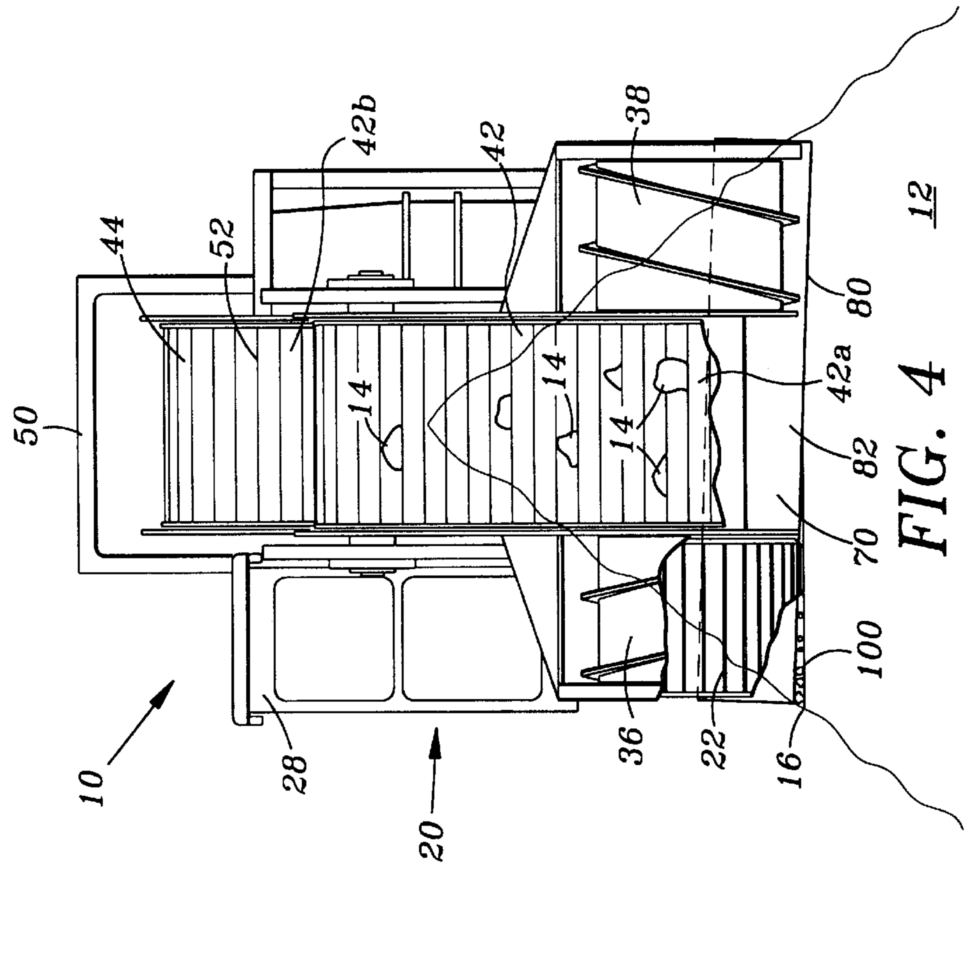
FIG. 4 is a front elevational view of the present self-loading mobile crusher system illustrating the mold board in a first position.

Spoil transfer assembly 40, conveyors 42, 44, and 62, hopper 50 and crushing assembly 60 are all mounted for movement on vehicle 20 which provides vehicular support for the above-identified components of system 10. As a result, the entire system 10 may be moved alongside an excavation at a site in order to quickly and efficiently pad a pipeline. Furthermore, system 10 can be moved over the top surface of a spoil pile, such as illustrated in FIGS. 1, 4, and 5 in order to crush debris from a top portion of the spoil pile 12. Since it is only necessary for fine grade material to be disposed around a pipe within an excavated trench, once the spoil has been crushed and the created fine grade material is deposited around the pipe, any remaining spoil having rocks 14 may be filled in the excavated trench on top of the fine grade material. As a result, the entire spoil pile 12 need not be crushed to a fine grade of material for pipeline padding. It is therefore desirable that tracked vehicle 20 move along surface 16 of spoil pile 12, receive spoil and rocks 14 from spoil pile 12 for crushing and subsequent delivery to an excavated trench.

Since tracked vehicle 20 is adapted to travel over surface 16 of spoil pile 12, it is essential that tracked vehicle 20 operate in a stable position and that track elements 22 and 24 are supported in a horizontal position. Otherwise, either one or both of track elements 22 and 24 may become unstable and tracked vehicle 20 may tilt and slide off of surface 16.

Figure 3:
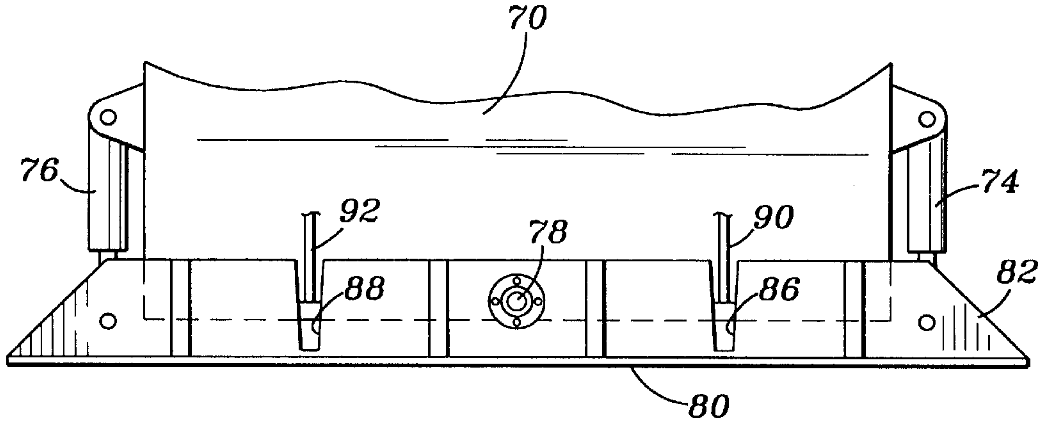
FIG. 3 is a sectional view taken generally along sectional lines 3—3 of FIG. 2 illustrating the present mold board.
Figure 2:
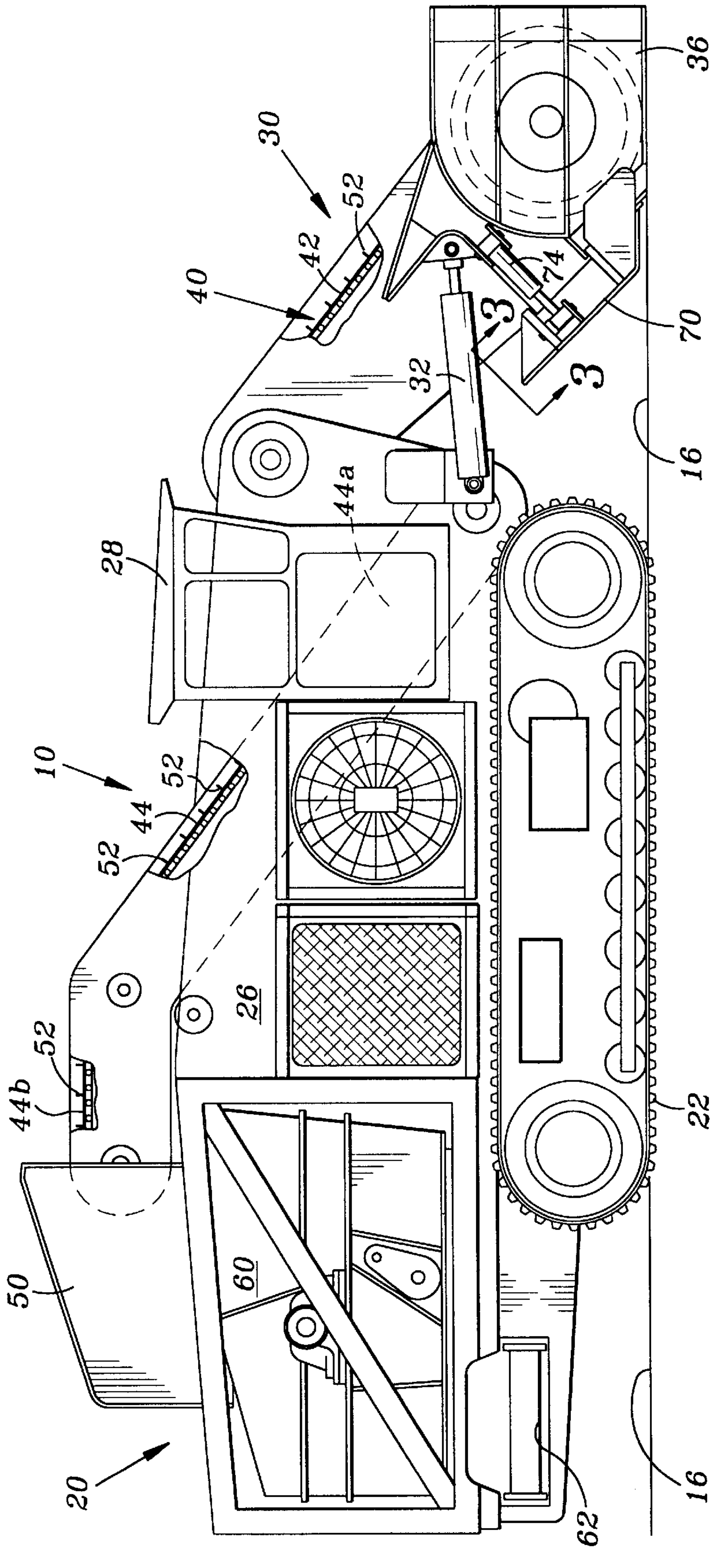
FIG. 2 is a side elevational view of the present self-loading mobile crusher system.

In accordance with the present invention, a mold board 70 is provided for creating a level surface 16 for supporting vehicle 20. Mold board 70 is pivotally attached to spoil transfer assembly 40 and is positioned forward of mainframe 26. Referring simultaneously to FIGS. 2 and 3, mold board 70 extends between auger assemblies 36 and 38, and rearward of conveyor 42. Mold board 70 is pivotally attached to spoil transfer assembly 40 utilizing hydraulic cylinders 74 and 76. Hydraulic cylinders 74 and 76 may be manually operated by an operator of system 10 or automatically operated based upon an automatic level sensing system (not shown). Mold board 70 pivots about a shaft 78. Mold board 70 includes an edge 80 and a spoil engaging surface 82. Spoil engaging surface 82 is disposed below conveyor end **42*a* of conveyor 42 between auger assemblies 36 and 38**.

As illustrated in FIG. 3, mold board 70 includes slots 86 and 88. Stops 90 and 92 are provided on spoil transfer assembly 40 and are positioned within slots 86 and 88, respectively. Mold board 70 is pivotally mounted on transfer assembly 40 to move between a horizontal position as illustrated in FIG. 3, to an extreme left position and to an extreme right position as illustrated in FIGS. 4 and 5, respectively. In the left position (FIG. 4), edge 80 of mold board 70 adjacent to auger 38 engages spoil pile 12 and edge 80 of mold board 70 adjacent to auger 36 creates a gap 100 between auger 36 and surface 16 thereby allowing spoil and rock 14 from spoil pile 12 to pass beneath auger 36 to the area between transfer assembly 40 and mainframe 26 such that spoil and rock 14 increase the height of surface 16 below track element 22. Passage of spoil and rock 14 to track element 22 enables tracked vehicle 20 to stabilize in the event that mainframe 26 is tilting to the right. In the position of mold board 70 illustrated in FIG. 4, stop 90 engages the lowermost portion of slot 86 (FIG. 3).

In order to allow spoil and rocks 14 from spoil pile 12 to pass under track element 24 in order to stabilize tracked vehicle 20, mold board 70 is pivoted to the position illustrated in FIG. 5 wherein edge 80 of mold board 70 engages spoil pile 12 below auger 36 to thereby create a gap 102 between auger 38 and surface 16. In this manner, spoil and rock 14 can pass from below transfer assembly 40 to increase the height of surface 16 below track element 24 and thereby raise the left side of tracked vehicle 20, thereby stabilizing the position of tracked vehicle 20 on surface 16. Mold board 70 in the position illustrated in FIG. 5 positions stop 92 to the bottom most position of slot 88 (FIG. 3).

It therefore can be seen that mold board 70 provides for a self-leveling function in order to maintain tracked vehicle 20 in a stable position on surface 16 of spoil pile 12. The positioning of mold board 70 controls the passage of spoil and rock 14 to increase the height of surface 16 under either track element 22 or track element 24 and controls the amount of material passing under track elements 22 and 24 due to the pivotal positioning of mold board 70 to either increase or decrease the size of gaps 100 and 102.

System 10 is self-loading due to the operation of augers 36 and 38 as tracked vehicle 20 moves along surface 16 of spoil pile 12. Conveyors 42 and 44 provide a continuous flow of spoil and rocks 14 to crusher assembly 60. The speed of each conveyor 42 and 44 is independently controlled and together with controlling the speed of tracked vehicle 20 a continuous flow of material to hopper 50 is maintained to feed crusher assembly 60 in a continuous manner. The use of traveling breaker plates in crusher assembly 60 allows for crushing of spoil which may be wet, or contain clay-like material which would otherwise jam a crushing device.

The size of gaps 100 and 102 may range from about three inches to about twelve inches to thereby maintain tracked vehicle 20 on approximately a 30 degree incline on the spoil pile 12.

Whereas the present invention has been described with respect to specific embodiments thereof, it will be understood that various changes and modifications will be suggested to one skilled in the art and it is intended to encompass such changes and modifications as fall within the scope of the appended claims.

We claim:

1. A method of pipeline padding by crushing spoil which has been piled on an underlying soil surface alongside an excavated trough and returning crushed spoil to the trough, comprising the steps of:

moving a vehicle having first and second sides on the surface of the spoil pile, the vehicle including first and second surface engaging devices disposed on the vehicle sides;

crushing spoil using a crushing device connected to the vehicle for movement with the vehicle;

transferring spoil from the spoil pile to the crushing device using a transferring device connected to the vehicle for movement with the vehicle; and controlling passage of spoil from the spoil pile forward of the surface engaging devices to a position under the surface engaging devices using a device disposed between the sides of the vehicle, adjacent the transferring device, and connected to the vehicle for movement with the vehicle for selectively allowing spoil to pass below the first surface engaging device and spoil to pass below the second surface engaging device to thereby selectively increase the height of the surface under either side of the vehicle on which the vehicle moves.

2. The method of claim 1 wherein the step of transferring spoil utilizes a conveyor.

3. The method of claim 1 wherein the step of transferring spoil utilizes a conveyor having a plurality of spaced apart elements for contacting and moving spoil, the plurality of elements being mounted for movement in an endless path.

4. The method of claim 1 and further including the step of returning crushed spoil to a location out of the forward path of the vehicle and into the pipeline trough.

5. The method of claim 1 wherein the step of transferring spoil includes:

transferring spoil using a first conveyor having first and second ends, the first end thereof disposed for receiving spoil from the spoil pile; and transferring spoil using a second conveyor having first and second ends, the first end thereof being adapted to receive spoil from the second end of the first conveyor for transporting spoil to the second end of the second conveyor, the second end of said second conveyor being disposed adjacent to the crushing device.

6. The method of claim 1 wherein the vehicle is self-propelled.

7. The method of claim 1 wherein the step of controlling passage of spoil utilizes a mold board.

8. The method of claim 7 wherein the mold board is pivotally mounted to move between first and second positions for selectively allowing spoil to pass below the first surface engaging device in the first position and spoil to pass below the second surface engaging device in the second position thereby selectively increasing the height of the surface under either side of the vehicle on which the vehicle moves.

* * * * *